United States Patent
Kang et al.

(10) Patent No.: US 9,379,539 B2
(45) Date of Patent: Jun. 28, 2016

(54) PROTECTION CIRCUIT, CIRCUIT PROTECTION METHOD USING THE SAME AND DISPLAY DEVICE

(71) Applicant: Samsung Display Co., Ltd., Yongin, Gyeonggi-Do (KR)

(72) Inventors: Byeong-Doo Kang, Yongin (KR); Weon-Jun Choe, Yongin (KR)

(73) Assignee: SAMSUNG DISPLAY CO., LTD. (KR)

( * ) Notice: Subject to any disclaimer, the term of this patent is extended or adjusted under 35 U.S.C. 154(b) by 407 days.

(21) Appl. No.: 14/082,896

(22) Filed: Nov. 18, 2013

(65) Prior Publication Data

US 2015/0002970 A1    Jan. 1, 2015

(30) Foreign Application Priority Data

Jun. 28, 2013    (KR) .................. 10-2013-0075565

(51) Int. Cl.
   *H02H 5/04*    (2006.01)
   *H02H 9/04*    (2006.01)
   *G09G 3/20*    (2006.01)

(52) U.S. Cl.
   CPC .............. *H02H 9/045* (2013.01); *G09G 3/20* (2013.01); *G09G 2310/0272* (2013.01); *G09G 2310/0297* (2013.01); *G09G 2330/045* (2013.01)

(58) Field of Classification Search
   USPC ........................................... 361/93.8
   See application file for complete search history.

(56) References Cited

U.S. PATENT DOCUMENTS

| 4,406,550 | A * | 9/1983 | Gray | G10K 1/026 374/110 |
| 7,262,752 | B2 * | 8/2007 | Weindorf | G02F 1/133603 315/291 |
| 7,606,679 | B1 * | 10/2009 | Voicu | H05B 33/0893 702/183 |
| 7,734,440 | B2 * | 6/2010 | Hattis | G01K 3/14 702/104 |
| 2004/0212554 | A1 * | 10/2004 | Kim | H05K 7/20963 345/41 |

(Continued)

FOREIGN PATENT DOCUMENTS

| KR | 200389959 Y1 | 7/2005 |
| KR | 100553525 B1 | 2/2006 |
| KR | 1020100000588 A | 1/2010 |

*Primary Examiner* — Ronald W Leja
(74) *Attorney, Agent, or Firm* — Cantor Colburn LLP

(57) ABSTRACT

A protection circuit includes: a temperature measuring unit which compares a voltage corresponding to a temperature at each of a plurality of sense points with a reference voltage, and generates a measurement result based on a result of comparison; a controller which generates a plurality of current control signals, which controls currents of a plurality of channels corresponding to the plurality of sense points, respectively, based on the measurement result from the temperature measuring unit; and a plurality of phase converter which outputs the currents of the plurality of channels based on the plurality of current control signals, wherein the controller generates the plurality of current control signals until the voltage corresponding to the temperature of each of the plurality of sense points is substantially equal to the reference voltage.

16 Claims, 4 Drawing Sheets

(56) References Cited

U.S. PATENT DOCUMENTS

| | | | | |
|---|---|---|---|---|
| 2004/0264093 | A1* | 12/2004 | Boerstler | G01K 1/026 361/103 |
| 2006/0161373 | A1* | 7/2006 | Mangrulkar | G01K 7/42 702/130 |
| 2006/0187731 | A1* | 8/2006 | Sako | G11C 11/406 365/222 |
| 2006/0238267 | A1* | 10/2006 | Bienek | G01K 7/42 331/176 |
| 2007/0195025 | A1* | 8/2007 | Korcharz | H05B 33/0893 345/82 |
| 2008/0088536 | A1* | 4/2008 | Lee | G09G 3/294 345/60 |
| 2008/0114967 | A1* | 5/2008 | Saen | G06F 1/3228 712/221 |
| 2010/0213919 | A1* | 8/2010 | Takayanagi | G06F 1/206 323/318 |
| 2012/0271481 | A1* | 10/2012 | Anderson | G06F 1/206 700/299 |
| 2013/0076381 | A1* | 3/2013 | Takayanagi | G01K 3/005 324/750.03 |
| 2015/0002970 | A1* | 1/2015 | Kang | H02H 9/045 361/86 |

* cited by examiner

US 9,379,539 B2

PROTECTION CIRCUIT, CIRCUIT PROTECTION METHOD USING THE SAME AND DISPLAY DEVICE

This application claims priority to Korean Patent Application No. 10-2013-0075565, filed on Jun. 28, 2013, and all the benefits accruing therefrom under 35 U.S.C. §119, the content of which in its entirety is herein incorporated by reference.

BACKGROUND (a) Field

Exemplary embodiments of the invention relate to a protection circuit and a circuit protection method using the protection circuit. More particularly, exemplary embodiments of the invention relate to a protection circuit which effectively prevents heat generation in a voltage supply circuit of a display device and a circuit protection method.

(b) Description of the Related Art

For operation of a power management integrated circuit ("PMIC") of a display device, a voltage higher than a reference voltage should be applied to a VIN terminal and an EN terminal. In such a PMIC, VIN power is power for operation of the PMIC and is applied to the VIN terminal, and EN power is power for determination of an operation time point of the PMIC and is applied to the EN terminal.

In a conventional PMIC of a display device, when the PMIC is normally operated with a voltage applied to a VIN terminal of the PMIC, a voltage is applied to an EN terminal and controlled at a direct-current-to-direct current ("DC/DC") control terminal to control a switching element. A conventional PMIC may have an over temperature protection function, but the over temperature protection function may not be activated under a specific condition, e.g., under an integrated circuit ("IC") test mode, such that the circuit may be damaged when the IC over temperature condition is continued at an external temperature of over 150 degrees.

SUMMARY

The invention has been made in an effort to solve an over temperature problem in a voltage display circuit in a display device caused by increase of a current deviation in channels of the display device.

An exemplary embodiment of a protection circuit according to the invention includes: a temperature measuring unit which compares a voltage corresponding to a temperature at each of a plurality of sense points with a reference voltage, and generates a measurement result based on a result of comparison; a controller which generates a plurality of current control signals, which controls currents of a plurality of channels corresponding to the plurality of sense points, respectively, based on the measurement result from the temperature measuring unit; and a plurality of phase converter which outputs the currents of the plurality of channels based on the plurality of current control signals, wherein the controller generates the plurality of current control signals until the voltage corresponding to the temperature of each of the plurality of sense points is substantially equal to the reference voltage.

In an exemplary embodiment, when the measurement result indicates that a voltage corresponding to a temperature at a sense point of the plurality of sense points is greater than the reference voltage, the controller may generate a first current control signal to reduce a current of a channel corresponding to the sense point among the plurality of channels, and a phase converter corresponding to the sense point among the plurality of phase converters may reduce the current in response to the first current control signal, and phase converters corresponding to the other sense points among the plurality of sense points may increase currents of corresponding channels based on the reduced amount of current according to the first current control signal in response to the first current control signal.

In an exemplary embodiment, when the measurement result indicates that a voltage corresponding to a sense point of the plurality of sense points is lower than the reference voltage, the controller may generate a second current control signal to increase a current of a channel corresponding to the sense point among the plurality of channels, and a phase converter corresponding to the sense point among the plurality of the phase converters may increase the current in response to the second current control signal, and phase converters corresponding to the other sense points of the plurality of sense points may reduce the current of each channel based on the increased amount of the current in response to the second current control signal.

In an exemplary embodiment, the temperature measuring unit may include: a plurality of variable resistors corresponding to the plurality of sense points, where a resistance of each of the plurality of variable resistors is decreased as a temperature of a corresponding sense point of the plurality of sense points is increased; a plurality of resistors connected to the plurality of variable resistors, respectively, in series; and a plurality of comparators corresponding to the plurality of variable resistors and the plurality of resistors, and each of the plurality of comparators includes: a non-inverse input terminal connected to a corresponding first variable resistor and a corresponding resistor; and an inverse terminal which receives the reference voltage, where each of the plurality of comparators may compare a voltage of the non-inverse input terminal with the reference voltage, and output a high value when the voltage of the non-inverse input terminal is higher than the reference voltage, a low vale when the voltage of the non-inverse input terminal is lower than the reference voltage, and zero when the voltage of the non-inverse input terminal is substantially equal to the reference voltage as the measurement result.

In an exemplary embodiment, when a comparator of the plurality of comparators outputs the high value, the controller may generate a first current circuit, which reduces a current of a channel corresponding to the comparator which outputs the high value until the measurement result becomes zero, and when a comparator of the plurality of comparators outputs the low value, the controller may generate a second current control signal, which increases a current of a channel corresponding to the comparator which outputs the low value until the measurement result becomes zero.

In an exemplary embodiment, the temperature measuring unit may include: a plurality of variable resistors corresponding to the plurality of sense points, where a resistance of each of the plurality of variable resistors increases as a temperature of a corresponding sense point of the plurality of sense points increases; and a plurality of comparators corresponding to the plurality of variable resistors, and each of the plurality of comparators includes: a non-inverse input terminal connected to a corresponding variable resistor; and an inverse input terminal which receives the reference voltage, where each of the plurality of comparators may compare a voltage of the inverse input terminal with the reference voltage, and output a high value when the voltage of the inverse input terminal is higher than the reference voltage, a low value when the voltage of the inverse input terminal is lower than the reference voltage, and zero when the voltage of the inverse input terminal is substantially equal to the reference voltage as the measurement result.

In an exemplary embodiment, when a comparator of the plurality of comparators outputs the high value, the controller may generate a first current circuit, which reduces a current of a channel corresponding to the comparator which outputs the high value until the measurement result becomes zero, and when a comparator of the plurality of comparators outputs the low value, the controller may generate a second current control signal, which increases a current of a channel corresponding to the comparator which outputs the low value until the measurement result becomes zero.

An exemplary embodiment of a circuit protection method according to the invention includes: measuring temperatures of a plurality of sense points corresponding to a plurality of channels, where a temperature of each sense point is increased substantially proportional to an amount of a current which flows in a corresponding channel; comparing a voltage corresponding to the measured temperature of each sense point with a reference voltage; and when a voltage corresponding to a temperature at a sense point of the plurality of sense points is greater than the reference voltage, reducing a current of a channel corresponding to the sense point, using a phase converter corresponding to the sense point, and increasing currents of channels corresponding to other sense points of the plurality of sense points based on the reduced amount of the current of the channels corresponding to the other sense points using phase converters corresponding to the other sense points.

In an exemplary embodiment, the a circuit protection method may further include when a voltage corresponding to a temperature at the sense point among the plurality of sense points is lower than the reference voltage, increasing the current of the channel corresponding to the sense point, using the phase converter corresponding to the sense point, and reducing the currents of channels corresponding to the other sense points of the plurality of sense points based on the reduced amount of the current of the channels corresponding to the other sense points using the phase converters corresponding to the other sense points.

According to another exemplary embodiment, a display device includes: a display panel including a plurality of pixels; and a driving board connected to the display panel, where the driving board includes a circuit which drives the display panel, where the driving board includes: a temperature measuring unit which compares a voltage corresponding to a temperature of each of a plurality of sense points of the driving board with a reference voltage, and generates a measurement result based on a result of comparison, a controller which generates a plurality of current control signals, which control currents of a plurality of channels corresponding to the plurality of sense points, respectively, based on the measurement result from the temperature measuring unit, and a protection circuit including a plurality of phase converters which outputs the currents of the plurality of channels based on the plurality of current control signals, where the controller generates the plurality of current control signals until the voltage corresponding to the temperature of each of the plurality of sense points becomes substantially equal to the reference voltage According to exemplary embodiments of a protection circuit and a circuit protection method using the protection circuit may effectively protect a voltage supply circuit of a display device from being overheated due to an increase of a current deviation in a plurality of channels.

BRIEF DESCRIPTION OF THE DRAWINGS

The above and other features of the invention will become more apparent by describing in detail exemplary embodiments thereof with reference to the attached drawings, in which.

DETAILED DESCRIPTION

Figure 1:
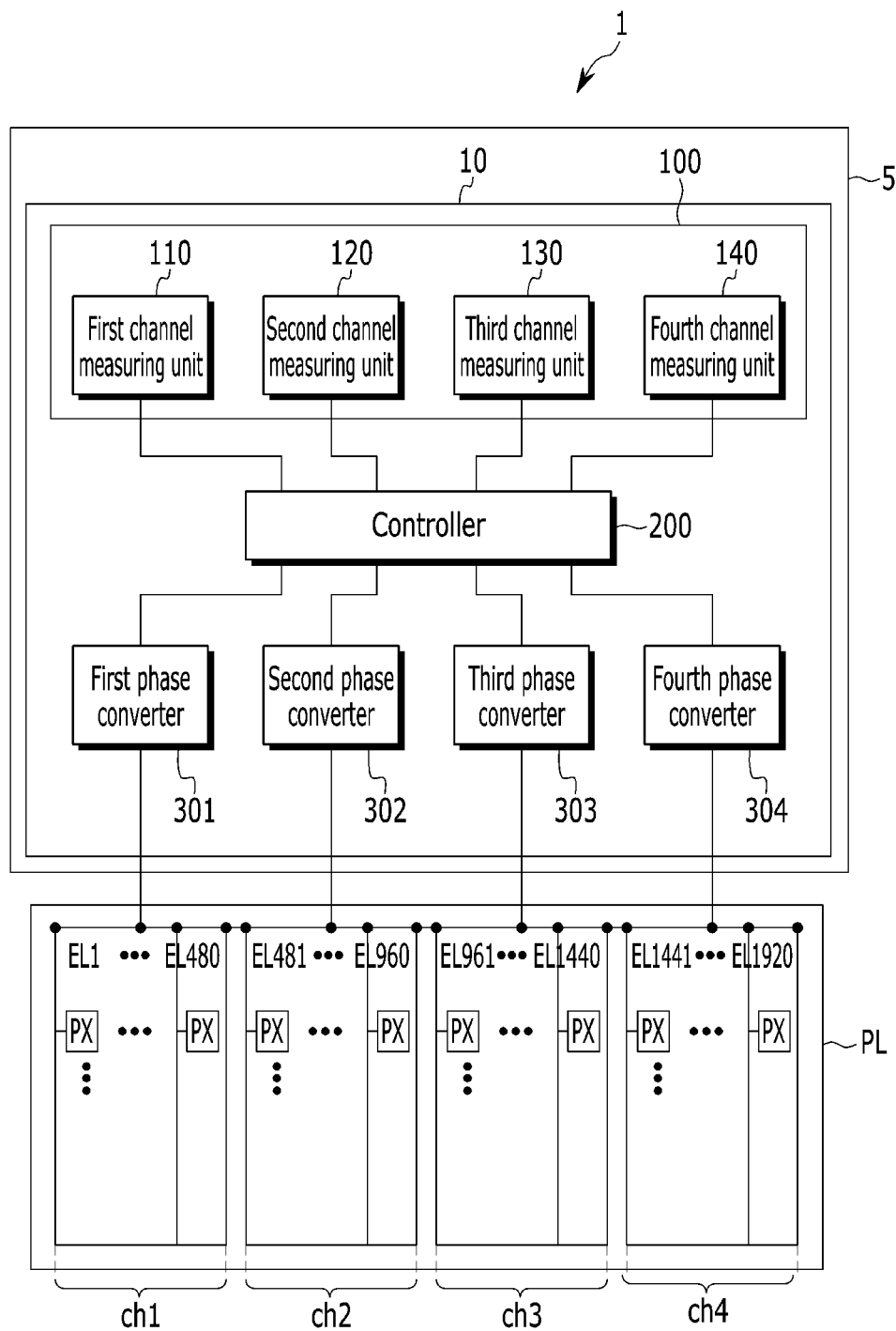
FIG. 1 is a block diagram showing an exemplary embodiment of a display device according the invention.

The invention will be described more fully hereinafter with reference to the accompanying drawings, in which embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, an exemplary embodiment of a protection circuit according to the invention will be described with reference to FIG. 1 and FIG. 2.

Figure 2:
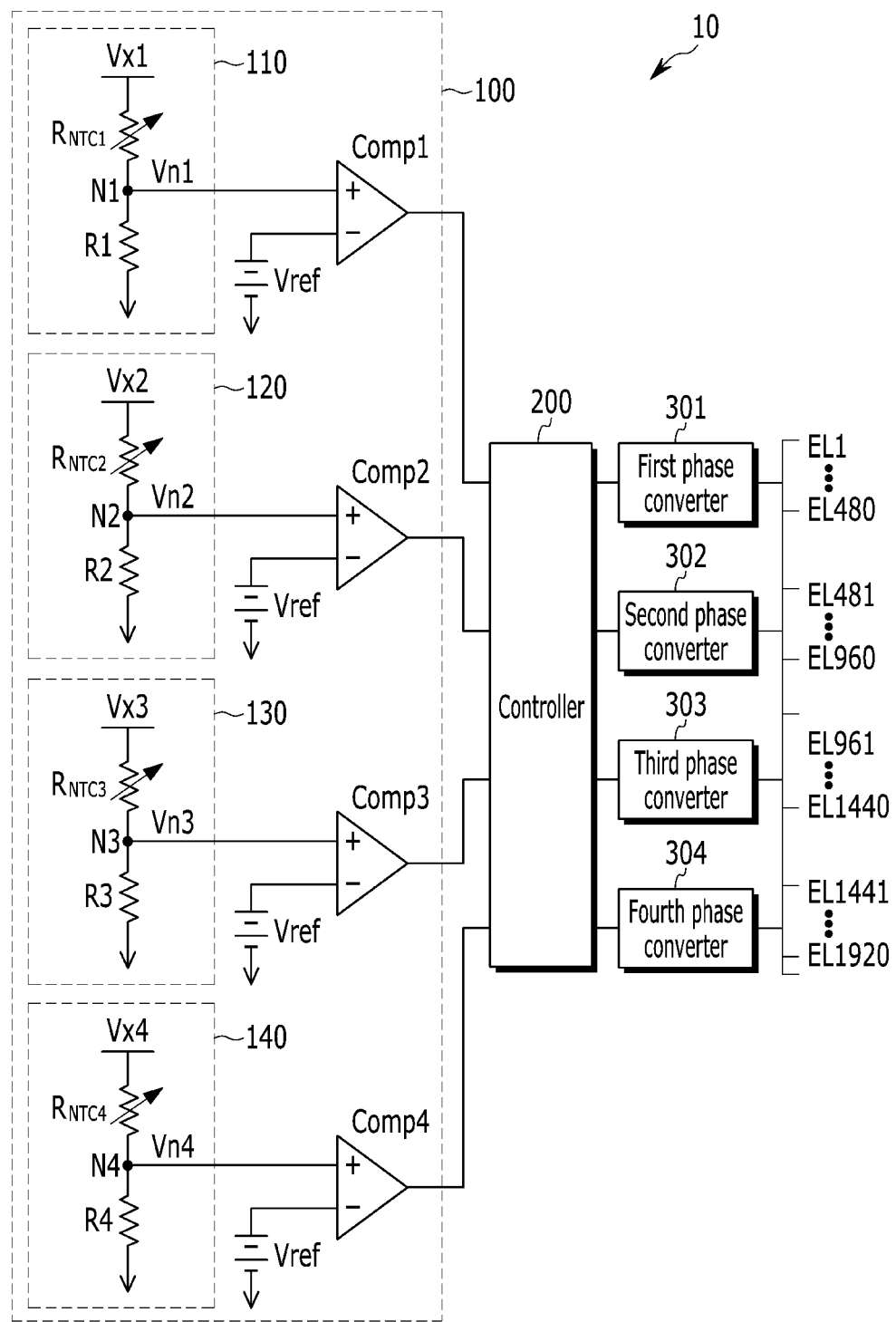
FIG. 2 is a block diagram showing an exemplary embodiment of a protection circuit according to the invention.

FIG. 1 is a block diagram showing an exemplary embodiment of a display device according to the invention, and FIG. 2 is a block diagram showing an exemplary embodiment of a protection circuit according to the invention.

An exemplary embodiment of a display device 1 according to the invention includes a driving board 5 including a protection circuit 10, and a display panel PL connected to the driving board 5. In such an embodiment, the display panel PL includes a plurality of pixels PX connected to a plurality of power lines EL1 to EL1920. In such an embodiment, the driving board 5 includes a circuit for driving of the display panel PL, and a plurality of protection circuits 10.

The protection circuit 10 includes a temperature measuring unit 100, a controller 200, and a plurality of phase converters, e.g., first to fourth phase converters 301 to 304.

In an exemplary embodiment, the protection circuit 10 decreases a temperature at a sense point that corresponds to a channel, to which an overcurrent flows, by decreasing the amount of current flowing to the channel, to which the overcurrent flows, based on a current control signal of the controller 200.

In an exemplary embodiment, as shown in FIG. 1, a first channel Ch1 is a path through which a current to be supplied to corresponding power lines EL1 to EL480 flows. A second channel Ch2 is a path through which a current to be supplied to corresponding power lines EL481 to EL960 flows. A third channel Ch3 is a path through which a current to be supplied to corresponding power lines EL961 to EL1440 flows. A fourth channel Ch4 is a path through which a current supplied to a plurality of power lines EL1 to EL1920 flows.

In an exemplary embodiment, the temperature measuring unit 100 measures temperature variation at a plurality of sense points, which is respectively corresponding to the plurality of channels Ch1 to Ch4, based on variation of the current flowing to the plurality of channels Ch1 to Ch4. The plurality of sense points may be defined in the driving board 5, and each of the plurality of sense points may be set to a point where a temperature variation occurs due to a current variation of the corresponding channel.

In an exemplary embodiment, the temperature measuring unit 100 compares a plurality of voltages corresponding to temperatures of the plurality of sense points, and transmits a measurement result to the controller 200 based on a result of the comparison.

In one exemplary embodiment, for example, the temperature measuring unit 100 outputs a high value when a voltage corresponding to a temperature at a random sense point is higher than a reference voltage, outputs a low value when the voltage corresponding to the temperature at the random sense point is lower than the reference voltage, and outputs zero when the voltage corresponding to the temperature at the random sense point is substantially equal to the reference voltage as the measurement result of the temperature measuring unit 100, and transmits the measurement result to the controller 200.

In an exemplary embodiment, the temperature measuring unit 100 includes a first channel measuring unit 110, a second channel measuring unit 120, a third channel measuring unit 130, a fourth channel measuring unit 140, and comparators Comp1, Comp2, Comp3, and Comp4, and each of the first to fourth channel measuring units 110, 120, 130 or 140 includes a reference voltage source Vx1, Vx2, Vx3 or Vx4, a variable resistor $R_{NTC1}$, $R_{NTC2}$, $R_{NTC3}$ or $R_{NTC4}$, and a resistor R1, R2, R3 or R4. In such an embodiment, a resistance of each variable resistor $R_{NTC1}$, $R_{NTC2}$, $R_{NTC3}$ or $R_{NTC4}$ decreases as a temperature of a corresponding sense point of the sense points is increased. In such an embodiment, resistances of the variable resistors $R_{NTC1}$, $R_{NTC2}$, $R_{NTC3}$ and $R_{NTC4}$ in the temperature measuring unit 100 are substantially greater than resistances of resistors R1, R2, R3 and R4 in the temperature measuring unit 100 at a room temperature. In one exemplary embodiment, for example, the resistors R1, R2, R3 and R4 of the first to fourth channel measuring units 110 to 140 may be disposed substantially close to the sense points.

First ends of the variable resistors $R_{NTC1}$, $R_{NTC2}$, $R_{NTC3}$ and $R_{NTC4}$ are respectively connected to the reference voltage sources Vx1, Vx2, Vx3 and Vx4, and second ends of the variable resistors $R_{NTC1}$, $R_{NTC2}$, $R_{NTC3}$ and $R_{NTC4}$ are respectively connected to nodes N1, N2, N3 and N4 of the first to fourth channel measuring units 110, 120, 130 and 140. First ends of the resistors R1, R2, R3 and R4 are respectively connected to the nodes N1, N2, N3 and N4, and the nodes N1, N2, N3 and N4 are respectively connected to non-inverse input terminals of the comparators Comp1, Comp2, Comp3 and Comp4.

Each inverse input terminal of the comparators Comp1, Comp2, Comp3 and Comp4 is applied with a reference voltage Vref, and each output terminal of the comparators Comp1, Comp2, Comp3 and Comp4 is connected to the controller 200.

In such an embodiment, a current flows to each of the plurality of channels, such that a temperature at a sense point corresponding to each channel may be higher than a room temperature. A voltage Vn1, Vn2, Vn3 or Vn4 at each node N1, N2, N3 or N4 may satisfy the following equation: $Vn = Vx \times R/(RNTC+R)$, where Vn denotes a voltage at a node (also referred to as a node voltage), Vx denotes a voltage of a corresponding reference source voltage, RNTC denotes a resistance of a corresponding variable resistor, and R denotes a resistance of a corresponding resistor.

In such an embodiment, when a current deviation occurs at a channel among the plurality of channels Ch1 to Ch4 and thus an overcurrent flows to at least one of the plurality of channels Ch1 to Ch4, a temperature of the channel, to which the overcurrent flows, is increased. Accordingly, a temperature at a sense point corresponding to the channel where the overcurrent flows is also increased, and therefore resistance of a variable resistor of the channel measuring unit of the sense point is decreased such that the node voltage Vn corresponding to the channel is increased.

In such an embodiment, when a current flowing at a channel among the plurality of channels Ch1 to Ch4 is lower than currents flowing to the other channels of the plurality of channels Ch1 to Ch4, a temperature of the channel, to which the low current flows, is decreased. Accordingly, a temperature at a sense point corresponding to the channel to which the low current flows is also decreased, and thus the resistance of a variable resistor of the measuring unit at the sense point is increased such that the node voltage Vn corresponding to the channel is decreased.

In an exemplary embodiment, voltages Vn1, Vn2, Vn3 and Vn4 of the non-inverse input terminals of the comparators Comp1, Comp2, Comp3 and Comp4 are compared with the reference voltage Vref input to the inverse input terminals of the comparators Comp1, Comp2, Comp3 and Comp4, respectively, and outputs a high value when the voltage Vn of the non-inverse input terminal is higher than the reference voltage, a low value when the voltage Vn is lower than the reference voltage and zero when the voltage Vn is substantially equal to the reference voltage, as a measurement result of the temperature measuring unit 100, and each of the comparators Comp1, Comp2, Comp3 and Comp4 transmits the measurement result to the controller 200.

In one exemplary embodiment, for example, when an overcurrent flows to the first channel Ch1 and thus a temperature at a first sense point corresponding to the first channel Ch1 is increased, the resistance of the variable resistor $R_{NTC1}$ of the first channel measuring unit 110 is decreased and a voltage Vn1 of a non-inverse input terminal is increased according to the equation above. When the non-inverse input terminal voltage V1 becomes higher than the reference voltage Vref, the comparator Com1 outputs a high value as a measurement result of the temperature measuring unit 100.

In such an embodiment, when the current flowing to the first channel Ch1 is lower than currents flowing to the second to fourth channels Ch2 to Ch4 and thus the temperature at the first sense point that corresponds to the first channel Ch1 is decreased, the resistance of the variable resistor $R_{NTC1}$ of the first channel measuring unit 110 is increased and the non-inverse input terminal voltage V1 is decreased according to the equation above. When the non-inverse input terminal voltage V1 of the first channel measuring unit 110 becomes lower than the reference voltage Vref, the comparator Comp1 of the first channel measuring unit 110 outputs a low value as a measurement result of the temperature measuring unit 100.

In an exemplary embodiment, the controller 200 generates a plurality of current control signals that control the currents of the plurality of channels respectively corresponding to the plurality of sense points based on the measurement result of the temperature measuring unit 100.

The controller 200 transmits a current control signal (hereinafter, referred to a first current control signal) that reduces the amount of current flowing through a high-temperature channel to the plurality of phase converters 301 to 304 based on the high value of the temperature measuring unit 100 until the measurement result at the low-temperature sense point becomes about zero (0), and generates a current control signal (hereinafter, referred to as a second current control signal) that increases the amount of current flowing through a low-temperature channel to the plurality of phase converters 301 to 304 until the measurement result at a low-temperature sense point becomes about zero (0).

In one exemplary embodiment, for example, when an overcurrent flows to the first channel Ch1 and thus the measurement result at the first sense point is the high value, the controller 200 generates the first current control signal that reduces the amount of current flowing through the first channel Ch1 and transmits the first current control signal to the first to fourth phase converters 301 to 304.

In such an embodiment, when a current lower than the current flowing to the second to fourth channels flows to the first channel Ch1 and thus the measurement result at the first sense point is the low value, the controller 200 generates the second current control signal that increases the amount of current flowing through the first channel Ch1 and transmits the second current control signal to the first to fourth phase converters 301 to 304.

Each of the first to fourth phase converters 301 to 304 control the amount current of a channel of the channels Ch1 to Ch4. In an exemplary embodiment of the invention, the term "phase" is used to distinguish a current corresponding to each of the plurality of channels Ch1 to Ch4.

Each of the first to fourth phase converters 301 to 304 increases or decreases the current of the corresponding channel of the channel Ch1 to Ch4 based on the current control signal of the controller 200, and outputs the increased or decreased current to the corresponding channel.

In such an embodiment, until the measurement result at the corresponding sense point becomes zero, a phase converter of a channel, to which an overcurrent flows, reduces the amount of the current of the channel, to which the overcurrent flows, based on the first current control signal. When the measurement result at the sense point that corresponds to the channel to which the overcurrent flows reaches zero, the phase converters corresponding to channels, to which no overcurrent flow, increase the amount of the current of the channels based on the reduced current amount of the overcurrent channel. In one exemplary embodiment, for example, a total increased amount of the current of the channels, to which no overcurrent flow, may be substantially the same as the reduced amount of the current of the channel, to which the over current flows.

When a current flowing to at least one of the first to fourth phase converters 301 to 304 is smaller than currents flowing to the other of the first to fourth phase converters 301 to 304, the at least one of the first to fourth phase converters 301 to 304 increases a current to a corresponding channel based on the second current control signal until the measurement result at a sense point of the corresponding channel, to which the small current flows, becomes zero. The other of the first to fourth phase converters 301 to 30 reduces the current of a corresponding channel based on the increase amount of the current of the channel to which the lower current flows until the measurement result at the corresponding sense point becomes zero. In one exemplary embodiment, for example, a total reduced amount of the current by the other of the first to fourth phase converters 301 to 304 is substantially the same as the increased amount of the current by the at least one of the first to fourth phase converters 301 to 304.

In an exemplary embodiment, the currents of the first to the fourth channels Ch1 to Ch4 are joined together, and the plurality of power lines EL1-EL1920 are thereby supplied with the same amount of current as each other.

In one exemplary embodiment, for example, when the overcurrent flows to the first channel Ch1, and thus the controller 200 generates the first current control signal and transmits the first current control signal to the first to fourth phase converters 301 to 304, the first phase converter 301 reduces the current flowing to the first channel Ch1 until the measurement result at a sense point corresponding to the first channel Ch1 becomes zero, and the second to fourth phase converters 302 to 304 increase currents flowing to the second to fourth channels Ch2 to Ch4 based on, e.g., as much as, the reduced amount of current of the first channel Ch1 until the measurement result at the sense point corresponding to the first channel Ch1 becomes zero.

In such an embodiment, when the current flowing to the first channel Ch1 is smaller than the currents flowing to the second to fourth channels Ch2 to Ch4, and thus the controller 200 generates the second current control signal and transmits the second current control signal to the first to fourth phase converters 301 to 304, the first phase converter 301 increases the current flowing to the first channel Ch1 until the measurement result at the sense point corresponding to the first channel Ch1 becomes zero, and the second to fourth phase converters 302 to 304 reduce the currents of the second to fourth channels Ch2 to Ch4 based on, e.g., as much as, the increased amount of the current of the first channel Ch1 until the measurement result at the sense point corresponding to the first channel Ch1 becomes zero.

Figure 3:
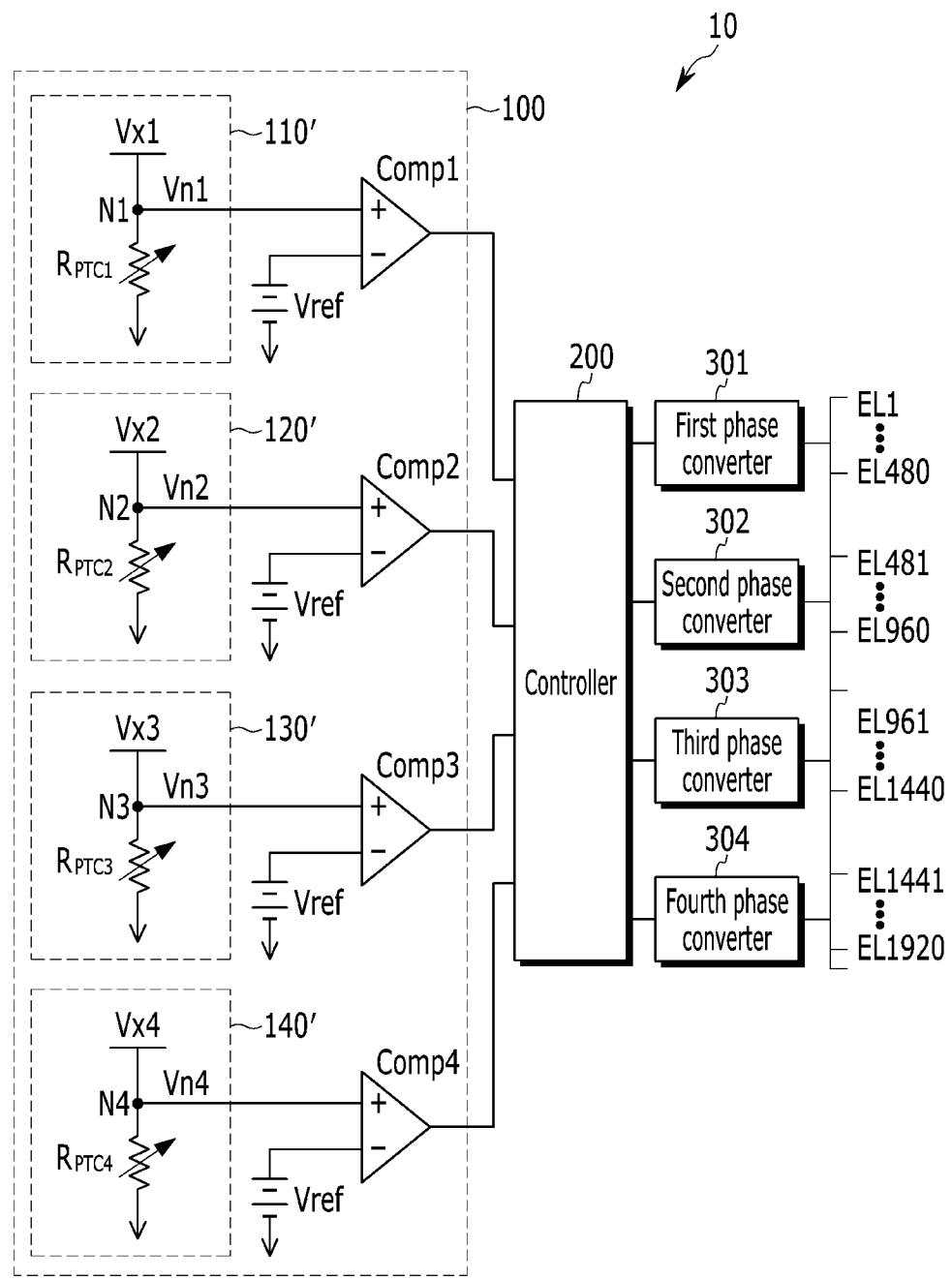
FIG. 3 is a block diagram showing an alternative exemplary embodiment of a protection circuit according to the invention.

FIG. 3 is a block diagram showing an alternative exemplary embodiment of a protection circuit according to the invention.

Hereinafter, an alternative exemplary embodiment of the display device 1 will be described in detail with reference to FIG. 1 to FIG. 3.

An alternative exemplary embodiment of the display device 1 includes the driving board 5 including the protection circuit 10 and the display panel PL connected to the driving board 5. The driving board 5 is a board where a circuit for driving of the display panel PL is disposed, and the driving board 5 may include a plurality of protection circuits 10.

The protection circuit 10 includes the temperature measuring unit 100, the controller 200, and the first to fourth phase converters 301 to 304.

The controller 200 and the first to fourth phase converters 301 to 304 of the exemplary embodiment of the protection circuit 10 shown in FIG. 3 are the same as the controller 200 and the first to fourth phase converters 301 to 304 of the exemplary embodiment of the protection circuit 10 shown in FIG. 2, and any repetitive detailed description thereof will hereinafter be omitted.

In an exemplary embodiment, the temperature measuring unit 100 measures temperature variation at a plurality of sense points, which is respectively corresponding to a plurality of channels Ch1 to Ch4, based on a variation of currents flowing to the plurality of channel Ch1 to Ch4. The plurality of sense points are defined in the driving board 5, and the plurality of sense points may be set to be points where temperature variation occurs based on the current variation of the corresponding channels. In one exemplary embodiment, for example, the plurality of sense points may be substantially close to the first to fourth phase converters 301 to 304.

In such an embodiment, the temperature measuring unit 100 compares a plurality of voltages corresponding to temperatures at the plurality of sense points with a reference voltage, and transmits a measurement result based on the comparison to the controller 200.

In one exemplary embodiment, for example, the temperature measuring unit 100 outputs a high value when a voltage corresponding to a temperature at a sense point is higher than the reference voltage, a low value when the voltage is lower than the reference voltage, and zero when the voltage equals the reference voltage as the measurement result of the temperature measuring unit 100, and transmits the measurement result to the controller 200.

In an exemplary embodiment, as shown in FIG. 3, the temperature measuring unit 100 includes a first channel measuring unit 110', a second channel measuring unit 120', a third channel measuring unit 130', and a fourth channel measuring unit 140', and each of the first to fourth channel measuring units 110' to 140' includes a first voltage sources Vx1, Vx2, Vx3 or Vx4 and a variable resistor $R_{PTC1}$, $R_{PTC2}$, $R_{PTC3}$ or $R_{PTC4}$. In such an embodiment, a resistance of the variable resistor $R_{PTC1}$, $R_{PTC2}$, $R_{PTC3}$ or $R_{PTC4}$ increases as a temperature of the channel is increased.

A first end of the variable resistor $R_{PTC1}$, $R_{PTC2}$, $R_{PTC3}$ or $R_{PTC4}$ is connected to a corresponding reference voltage source Vx1, Vx2, Vx3 or Vx4, and a second end of the variable resistor $R_{PTC1}$, $R_{PTC2}$, $R_{PTC3}$ or $R_{PTC4}$ is connected to a corresponding node N1, N2, N3 and N4.

Non-inverse terminals of comparators Comp1, Comp2, Comp3 and Comp4 are respectively connected to the nodes N1, N2, N3 and N4, and each of inverse terminals of the comparators Comp1, Comp2, Comp3 and Comp4 is applied with a reference voltage Vref. Each of output terminals of the comparators Comp1, Comp2, Comp3 and Comp4 is connected to the controller 200.

In an exemplary embodiment, when a current variation occurs in at least one of the plurality of channels Ch1 to Ch4, and thus an overcurrent flows to the at least one of the plurality of channels Ch1 to Ch4, a temperature of the channel, to which the overcurrent flows is increased. Accordingly, a temperature at a sense point corresponding to the channel to which the overcurrent flows is also increased such that a resistance of the variable resistor of a measuring unit corresponding to the at least one of the plurality of channels Ch1 to Ch4 is increased, and thus a node voltage Vn of the measuring unit is increased.

In such an embodiment, when a current flowing to at least one of the plurality of channels Ch1 to Ch4 is smaller than a current flowing to the other of the plurality of channels Ch1 to Ch4, a temperature of the channel, to which the small current flows, is decreased. Accordingly, a temperature at a sense point corresponding to the at least one of the plurality of channels Ch1 to Ch4, to which the small current flows, is also decreased such that the resistance of the variable resistor of a measuring unit corresponding to the at least one of the plurality of channels Ch1 to Ch4 is decreased, and thus the node voltage Vn the measuring unit is decreased.

Operations of the respective comparators Comp1, Comp2, Comp3 and Comp4, the controller 200, and the first to fourth phase converters 301 according to the node voltage Vn of the first to fourth phase converters 301 to 304 are the same as those of first exemplary embodiment, and therefore no further description will be provided.

In an exemplary embodiment, as described above with reference to FIGS. 1 to 3, the protection circuit 10 controls the amount of current flowing through the plurality of channels based on temperatures at the sense points therein to maintain constant current amount supplied to the power lines EL1 to EL1920, and effectively maintains the temperature at the sense points, which are corresponding to the channels, respectively.

In an exemplary embodiment, as shown in FIG. 2 and FIG. 3, four channels are defined, but the invention is not limited thereto. In an alternative exemplary embodiment, the number of the channels may be variously modified.

Figure 4:
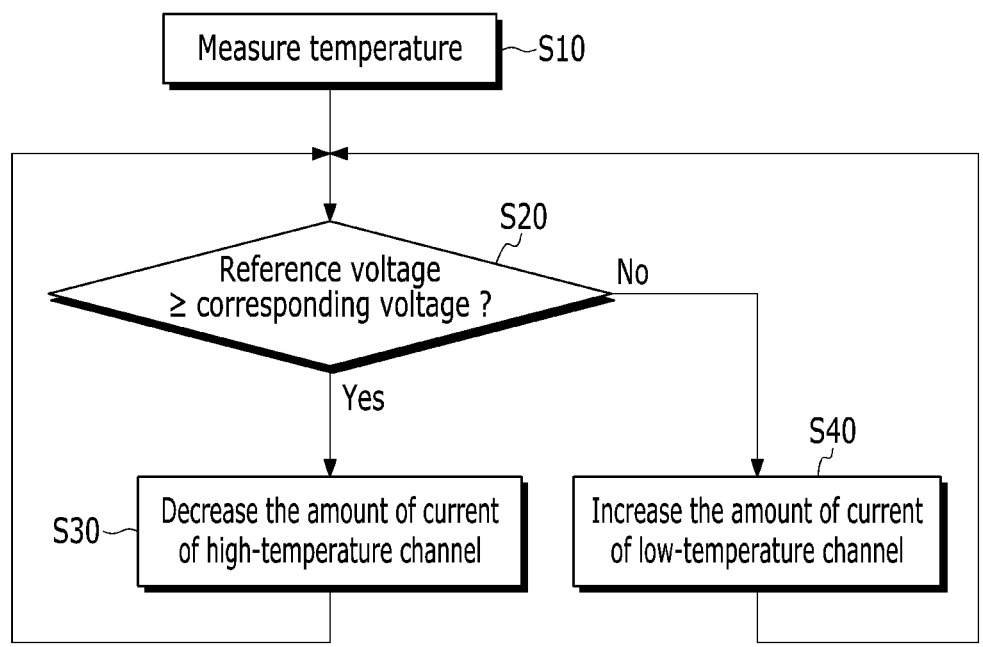
FIG. 4 is a flowchart showing an exemplary embodiment of a protection method of a circuit according to the invention.

FIG. 4 is a flowchart showing an exemplary embodiment of an overheating protection method according to the invention.

Operations of the temperature measuring unit 100, the controller 200 and the first to fourth phase converters 301 to 304 of the protection circuit 10 in the method shown in FIG. 4 are substantially the same as the operations of the temperature measuring unit 100, the controller 200 and the first to fourth phase converters 301 to 304 of the protection circuit 10 described with reference to FIGS. 1 to 3, and any repetitive detailed description thereof will hereinafter be omitted.

In an exemplary embodiment, a temperature variation at the plurality of sense points that respectively correspond to the plurality of channels Ch1 to Ch4 is measured (S10). In one exemplary embodiment, for example, the temperature measuring unit 100 measures temperature variation at the plurality of sense points based on the variation of the currents flowing to the plurality of channels Ch1 to Ch4.

In such an embodiment, a voltage corresponding to a temperature at the sense point is compared with a reference voltage (S20). In one exemplary embodiment, for example, the temperature measuring unit 100 compares the voltage corresponding to the temperature at the sense point with the reference voltage, and outputs a high value when the voltage corresponding to the temperature of the sense point is higher than the reference voltage, a low value when the voltage is lower than the reference voltage, and zero when the voltage equals the reference voltage as a measurement result of the temperature measuring unit 100.

In such an embodiment, when the reference voltage is substantially equal to or greater than the voltage corresponding to the temperature at the sense point, the amount of the current to a channel corresponding to the sense point is decreased (S30). In one exemplary embodiment, for example, when the reference voltage is substantially equal to or greater than the voltage corresponding to the temperature at the sense point, the high value is output from the temperature measuring unit 100 as the measurement result of the sense point, and the controller 200 thereby transmits the first current control signal to the plurality of phase converters 301 to 304 to decrease the amount of the current to a channel corresponding to the sense point, until the measurement result of the sense point, i.e., the high value, becomes zero.

In such an embodiment, until the measurement result of the sense point, which is the high value, becomes zero, a phase converter corresponding to the sense point among the plurality of phase converters 301 to 304 reduces the current of the channel, and the other phase converters of the plurality of phase converters 301 to 304 increase the currents of the corresponding channels based on the reduced amount of the current channel that corresponds to the sense point at the temperature corresponding to the high value.

In such an embodiment, when the reference voltage is less than the voltage corresponding to the temperature at the sense point, the amount of the current to a channel corresponding to the sense point is increased (S40). In one exemplary embodiment, for example, when the reference voltage is less than the voltage corresponding to the temperature at the sense point, the low value is output from the temperature measuring unit 100100 as the measurement result of the sense point, and the controller 200 thereby transmits the second current control signal to the plurality of phase converters 301 to 304 to increase the amount of the current to a channel corresponding to the sense point, until the measurement result of the sense point, i.e., the low value, becomes zero.

In such an embodiment, until the measurement result of the sense point, which is the low value, becomes zero, the phase converter corresponding to the sense point among the plurality of phase converters 301 to 304 increases the current of the corresponding channel, and the other phase converters among the plurality of phase converters 301 to 304 reduce the currents of the corresponding channels based on the increased amount of the current channel that corresponds to the sense point at the temperature corresponding to the low value.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A protection circuit comprising:
   a temperature measuring unit which compares a voltage corresponding to a temperature at each of a plurality of sense points, with a reference voltage, and generates a measurement result based on a result of comparison;
   a controller which generates a plurality of current control signals, which controls currents of a plurality of channels corresponding to the plurality of sense points, respectively, based on the measurement result from the temperature measuring unit; and
   a plurality of phase converters which outputs the currents of the plurality of channels based on the plurality of current control signals,
   wherein the controller generates the plurality of current control signals until the voltage corresponding to the temperature at each of the plurality of sense points becomes substantially equal to the reference voltage.

2. The protection circuit of claim 1, wherein when the measurement result indicates that a voltage corresponding to a temperature at a sense point among the plurality of sense points is greater than the reference voltage,
   the controller generates a first current control signal to reduce a current of a channel corresponding to the sense point, among the plurality of channels, and
   a phase converter corresponding to the sense point, among the plurality of phase converters, reduces the current in response to the first current control signal, and phase converters corresponding to the other sense points among the plurality of sense points increase currents of corresponding channels based on the reduced amount of current according to the first current control signal in response to the first current control signal.

3. The protection circuit of claim 1, wherein when the measurement result indicates that a voltage corresponding to a sense point among the plurality of sense points is lower than the reference voltage,
the controller generates a second current control signal to increase a current of a channel corresponding to the sense point, among the plurality of channels, and
a phase converter corresponding to the sense point, among the plurality of the phase converters increases the current in response to the second current control signal, and phase converters corresponding to the other sense points among the plurality of sense points reduce the current of each channel based on the increased amount of the current in response to the second current control signal.

4. The protection circuit of claim 1, wherein the temperature measuring unit comprises:
a plurality of variable resistors corresponding to the plurality of sense points, wherein a resistance of each of the plurality of variable resistors is decreased as a temperature of a corresponding sense point among the plurality of sense points is increased;
a plurality of resistors connected to the plurality of variable resistors, respectively, in series; and
a plurality of comparators corresponding to the plurality of variable resistors and the plurality of resistors, and
each of the plurality of comparators comprises:
a non-inverse input terminal connected to a corresponding first variable resistor and a corresponding resistor; and
an inverse terminal which receives the reference voltage,
wherein each of the plurality of comparators compares a voltage of the non-inverse input terminal with the reference voltage, and outputs a high value when the voltage of the non-inverse input terminal is higher than the reference voltage, a low vale when the voltage of the non-inverse input terminal is lower than the reference voltage, and zero when the voltage of the non-inverse input terminal is substantially equal to the reference voltage as the measurement result.

5. The protection circuit of claim 4, wherein
when a comparator among the plurality of comparators outputs the high value, the controller generates a first current circuit, which reduces a current of a channel corresponding to the comparator which outputs the high value until the measurement result becomes zero, and
when a comparator among the plurality of comparators outputs the low value, the controller generates a second current control signal, which increases a current of a channel corresponding to the comparator which outputs the low value until the measurement result becomes zero.

6. The protection circuit of claim 1, wherein the temperature measuring unit comprises:
a plurality of variable resistors corresponding to the plurality of sense points, wherein a resistance of each of the plurality of variable resistors increases as a temperature of a corresponding sense point among the plurality of sense points increases; and
a plurality of comparators corresponding to the plurality of variable resistors, and
each of the plurality of comparators comprises:
a non-inverse input terminal connected to a corresponding variable resistor; and
an inverse input terminal which receives the reference voltage,
wherein each of the plurality of comparators compares a voltage of the inverse input terminal with the reference voltage, and outputs a high value when the voltage of the inverse input terminal is higher than the reference voltage, a low value when the voltage of the inverse input terminal is lower than the reference voltage, and zero when the voltage of the inverse input terminal is substantially equal to the reference voltage as the measurement result.

7. The protection circuit of claim 6, wherein
when a comparator among the plurality of comparators outputs the high value, the controller generates a first current circuit, which reduces a current of a channel corresponding to the comparator which outputs the high value until the measurement result becomes zero, and
when a comparator of the plurality of comparators outputs the low value, the controller generates a second current control signal, which increases a current of a channel corresponding to the comparator which outputs the low value until the measurement result becomes zero.

8. A circuit protection method comprising:
measuring temperatures of a plurality of sense points corresponding to a plurality of channels, wherein a temperature of each sense point is increased substantially proportional to an amount of a current which flows in a corresponding channel;
comparing a voltage corresponding to the measured temperature of each sense point with a reference voltage; and
when a voltage corresponding to a temperature at a sense point among the plurality of sense points is greater than the reference voltage, reducing a current of a channel corresponding to the sense point, using a phase converter corresponding to the sense point, and increasing currents of channels corresponding to other sense points among the plurality of sense points based on the reduced amount of the current of the channels corresponding to the other sense points using phase converters corresponding to the other sense points.

9. The circuit protection method of claim 8, further comprising:
when a voltage corresponding to a temperature at the sense point among the plurality of sense points is lower than the reference voltage, increasing the current of the channel corresponding to the sense point, using the phase converter corresponding to the sense point, and reducing the currents of channels corresponding to the other sense points among the plurality of sense points based on the reduced amount of the current of the channels corresponding to the other sense points using the phase converters corresponding to the other sense points.

10. A display device comprising:
a display panel comprising a plurality of pixels; and
a driving board connected to the display panel, wherein the driving board comprises a circuit which drives the display panel,
wherein the driving board comprises:
a temperature measuring unit which compares a voltage corresponding to a temperature of each of a plurality of sense points of the driving board with a reference voltage, and generates a measurement result based on a result of comparison,
a controller which generates a plurality of current control signals, which control currents of a plurality of channels corresponding to the plurality of sense points, respectively, based on the measurement result from the temperature measuring unit, and a protection circuit comprising a plurality of phase converters which outputs the currents of the plurality of channels based on the plurality of current control signals, wherein the controller generates the plurality of current control signals until the voltage corresponding to the temperature of each of the plurality of sense points becomes substantially equal to the reference voltage.

11. The display device of claim 10, wherein
when the measurement result indicates that a voltage corresponding to a temperature at a sense point among the plurality of sense points is greater than the reference voltage,
the controller generates a first current control signal to reduce a current of a channel corresponding to the sense point, among the plurality of channels, and
a phase converter corresponding to the sense point, among the plurality of phase converters reduces the current in response to the first current control signal, and phase converters corresponding to the other sense points among the plurality of sense points increase currents of corresponding channels based on the reduced amount of current according to the first current control signal in response to the first current control signal.

12. The display device of claim 10, wherein
when the measurement result indicates that a voltage corresponding to a sense point among the plurality of sense points is lower than the reference voltage,
the controller generates a second current control signal to increase a current of a channel corresponding to the sense point, among the plurality of channels, and
a phase converter corresponding to the sense point, among the plurality of the phase converters, increases the current in response to the second current control signal, and phase converters corresponding to the other sense points of the plurality of sense points reduce the current of each channel based on the increased amount of the current in response to the second current control signal.

13. The display device of claim 10, wherein the temperature measuring unit comprises;
a plurality of variable resistors corresponding to the plurality of sense points, wherein a resistance of each of the plurality of variable resistors is decreased as a temperature of a corresponding sense point of the plurality of sense points is increased;
a plurality of resistors connected to the plurality of variable resistors, respectively, in series; and
a plurality of comparators corresponding to the plurality of variable resistors and the plurality of resistors,
wherein each of the plurality of comparators comprises:
a non-inverse input terminal connected to a corresponding first variable resistor and a corresponding resistor; and
an inverse input terminal which receives the reference voltage,
wherein each of the plurality of comparators compares a voltage of the non-inverse input terminal with the reference voltage, and outputs a high value when the voltage of the non-inverse input terminal is higher than the reference voltage, a low value when the voltage of the inverse input terminal is lower than the reference voltage, and zero when the voltage of the inverse input terminal is substantially equal to the reference voltage as the measurement result.

14. The display device of claim 13, wherein
when a comparator among the plurality of comparators outputs the high value, the controller generates a first current circuit, which reduces a current of a channel corresponding to the comparator which outputs the high value until the measurement result becomes zero, and
when a comparator of the plurality of comparators outputs the low value, the controller generates a second current control signal, which increases a current of a channel corresponding to the comparator which outputs the low value until the measurement result becomes zero.

15. The display device of claim 10, wherein
the temperature measuring unit comprises:
a plurality of variable resistors corresponding to the plurality of sense points, wherein a resistance of each of the plurality of variable resistors increases as a temperature of a corresponding sense point of the plurality of sense points increases; and
a plurality of corresponding to the plurality of variable resistors comparators, and
each of the plurality of comparators comprises:
a non-inverse input terminal connected to a corresponding variable resistor; and
an inverse input terminal to which the reference voltage is input,
wherein each of the plurality of comparators compares a voltage of the inverse input terminal with the reference voltage, and outputs a high value when the voltage of the inverse input terminal is higher than the reference voltage, a low value when the voltage of the inverse input terminal is lower than the reference voltage, and zero when the voltage of the inverse input terminal is substantially equal to the reference voltage as the measurement result.

16. The display device of claim 15, wherein
when a comparator among the plurality of comparators outputs the high value, the controller generates a first current circuit, which reduces a current of a channel corresponding to the comparator which outputs the high value until the measurement result becomes zero, and
when a comparator of the plurality of comparators outputs the low value, the controller generates a second current control signal, which increases a current of a channel corresponding to the comparator which outputs the low value until the measurement result becomes zero.

* * * * *